US012597868B2

(12) United States Patent
Regazzi et al.

(10) Patent No.: US 12,597,868 B2
(45) Date of Patent: Apr. 7, 2026

(54) THREE-PHASE SYNCHRONOUS RECTIFIER FOR CHARGING A BATTERY ON BOARD THE VEHICLE

(71) Applicant: DUCATI ENERGIA S.p.A., Bologna (IT)

(72) Inventors: Gianni Regazzi, Bologna (IT); Pierluigi Calabri, Bologna (IT); Nicolò Regazzi, Bologna (IT); Adrian Popov, Bologna (IT)

(73) Assignee: DUCATI ENERGIA S.p.A., Bologna (IT)

( * ) Notice: Subject to any disclaimer, the term of this patent is extended or adjusted under 35 U.S.C. 154(b) by 723 days.

(21) Appl. No.: 17/918,548

(22) PCT Filed: Apr. 14, 2021

(86) PCT No.: PCT/IB2021/053066
§ 371 (c)(1),
(2) Date: Oct. 12, 2022

(87) PCT Pub. No.: WO2021/209913
PCT Pub. Date: Oct. 21, 2021

(65) Prior Publication Data
US 2023/0139177 A1 May 4, 2023

(30) Foreign Application Priority Data
Apr. 16, 2020 (IT) ........................ 102020000008086

(51) Int. Cl.
*H02M 7/219* (2006.01)
*B60R 16/02* (2006.01)
(Continued)

(52) U.S. Cl.
CPC ........... *H02M 7/2195* (2021.05); *B60R 16/02* (2013.01); *H02J 7/02* (2013.01); *H02J 7/14* (2013.01);
(Continued)

(58) Field of Classification Search
CPC .................................................. H02J 2207/20
(Continued)

(56) References Cited

U.S. PATENT DOCUMENTS

| | | | |
|---|---|---|---|
| 6,275,012 B1 * | 8/2001 | Jabaji | ...................... H02P 9/307 |
| | | | 322/90 |
| 8,159,180 B2 * | 4/2012 | Suzuki | .................. H02J 7/1492 |
| | | | 320/148 |

(Continued)

FOREIGN PATENT DOCUMENTS

| | | |
|---|---|---|
| EP | 1 109 310 A2 | 6/2001 |
| EP | 2 793 391 A1 | 10/2014 |

*Primary Examiner* — Yalkew Fantu
(74) *Attorney, Agent, or Firm* — ASLAN LAW, P.C.

(57) ABSTRACT

A three-phase synchronous rectifier for charging a battery on board the vehicle, comprising a first and a second input which are independent of each other and each connectable to a respective first and second three-phase output branch of a generator, two independent negative and positive outputs each connectable to the respective poles of the battery, a first group of three rectification units configured to be connected to the first output branch of the generator via said first input, a second group of three rectification units configured to be connected to the second output branch of said generator via the second input. Advantageously, the rectification units are configured to be simultaneously connected to the battery of the vehicle.

6 Claims, 5 Drawing Sheets

(51) Int. Cl.

| | |
|---|---|
| *H02J 7/02* | (2016.01) |
| *H02J 7/14* | (2006.01) |
| *H02M 7/00* | (2006.01) |
| *H02M 7/23* | (2006.01) |
| *H02J 7/00* | (2006.01) |
| *H02M 1/00* | (2006.01) |

(52) U.S. Cl.
CPC ............. *H02M 7/003* (2013.01); *H02M 7/23* (2013.01); *H02J 7/0034* (2013.01); *H02J 2207/20* (2020.01); *H02J 2310/46* (2020.01); *H02M 1/0009* (2021.05)

(58) Field of Classification Search
USPC .......................................................... 320/165
See application file for complete search history.

(56) References Cited

U.S. PATENT DOCUMENTS

| | | | | |
|---|---|---|---|---|
| 9,214,870 B2 * | 12/2015 | Chiba | ............... | H02M 3/33592 |
| 2014/0292286 A1 * | 10/2014 | Tabata | .................... | H02P 9/102 |
| | | | | 322/94 |
| 2018/0254732 A1 * | 9/2018 | Smolenaers | .............. | H02J 1/12 |

* cited by examiner

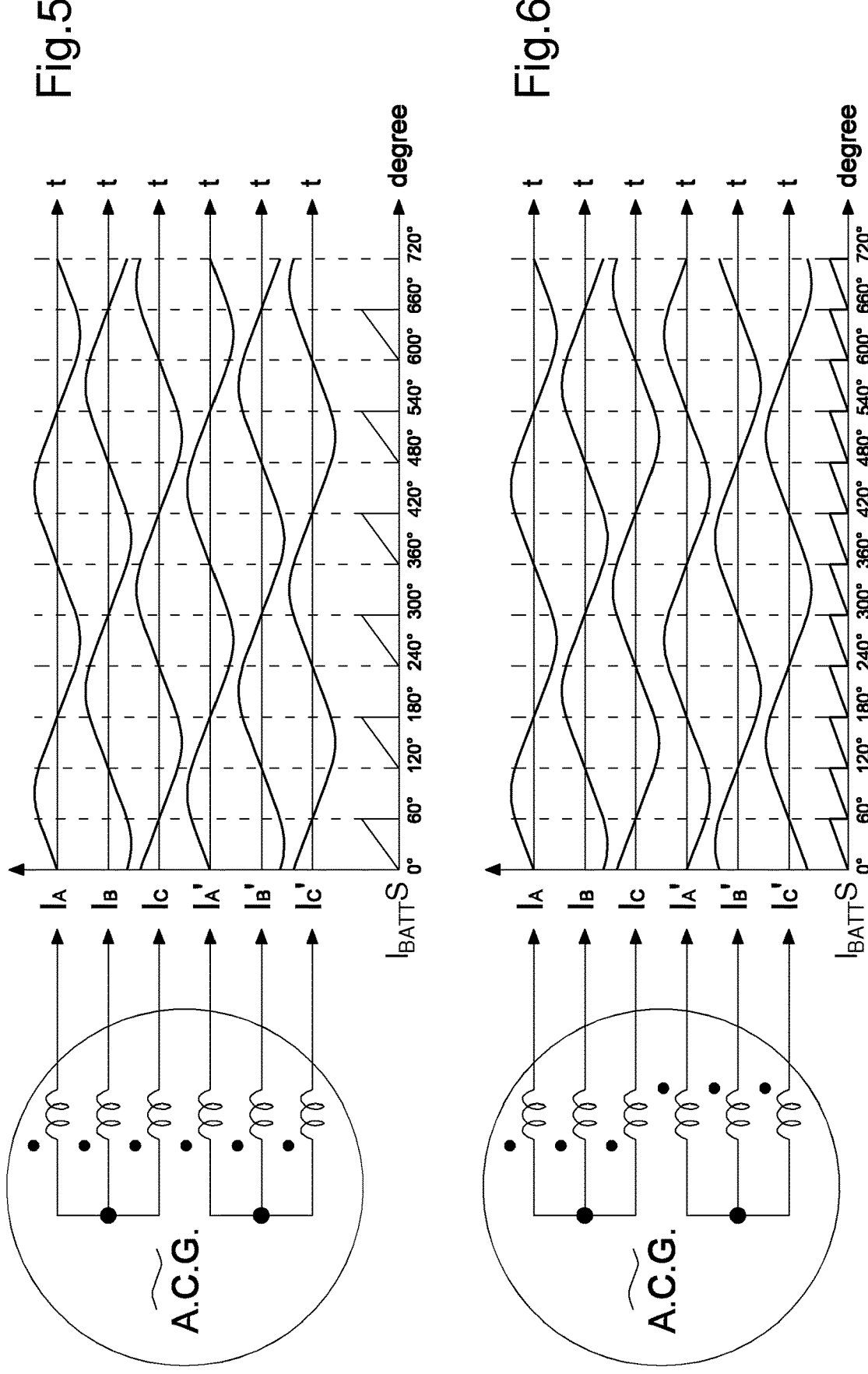

THREE-PHASE SYNCHRONOUS RECTIFIER FOR CHARGING A BATTERY ON BOARD THE VEHICLE

CROSS-REFERENCE TO RELATED APPLICATIONS

This application claims priority to IT patent application No. 102020000008086 filed on Apr. 16, 2020, and this application claims priority to and is a 371 of international PCT Application No. PCT/IB2021/053066 filed on Apr. 14, 2021, the entire contents of which are hereby incorporated by reference.

TECHNICAL FIELD

The present invention relates to a three-phase synchronous rectifier for charging a battery on board the vehicle.

BACKGROUND ART

The increasing need for high power on board vehicles has led to the development of systems for the production of electrical energy currently able to deliver currents of over 120 A with nominal voltages of about 12V.

In the case of special motor applications such as, e.g., ATVs (All-Terrain Vehicles) or snowmobiles, these systems are generally made by connecting a three-phase AC generator with permanent magnets, which converts the mechanical power of the endothermic engine into electrical power, to a voltage regulator that rectifies the three-phase alternating current coming out of the generator to supply the vehicle battery to which the various vehicle charges are connected, with a rectified direct voltage kept constant at a value of 14.5V.

It should also be specified that in the vehicles listed above, conventional automotive-type generators and regulators cannot be used due to space constraints. A typical solution for regulating such high currents using compact devices involves, in fact, separating the three-phase outputs downstream of the AC generator wherein each output is connected to an individual voltage regulator. The use of two separate outputs makes it possible, as far as possible, to limit the electrical current circulating in the individual connection through the use of small regulators.

It has however been noted that the use of two separate regulators does not allow the same level of regulation voltage and inevitably the currents in the two three-phase branches at the input and output of the regulators will be unbalanced. It follows that this unbalance will produce a reduction in the total efficiency of the electrical energy generation system as well as any possible vibrations due to the misalignment of the forces operating between the rotor and stator of the permanent magnet generator.

DESCRIPTION OF THE INVENTION

In view of the problems set out above, the main aim of the present invention is to devise a three-phase synchronous rectifier for charging a battery on board the vehicle that allows the individual currents at the output from the two three-phase windings of the AC generator to be managed and kept balanced by means of an individual compact regulating unit and capable of simultaneously regulating current values even beyond 150 A.

Another object of the present invention is to devise a three-phase synchronous rectifier which allows battery protection in case of disconnections and/or wrong polarity connections or in case of short circuits at the output of the regulating unit.

Another object of the present invention is to devise a three-phase synchronous rectifier which allows to overcome the mentioned drawbacks of the prior art within a simple, rational, easy, effective to use and affordable solution.

The above-mentioned objects are achieved by the present three-phase synchronous rectifier for charging a battery on board the vehicle according to the characteristics described the claimed invention.

A further object of the present invention is to devise a three-phase synchronous rectifier system according to the characteristics described in the claimed invention.

BRIEF DESCRIPTION OF THE DRAWINGS

Other characteristics and advantages of the present invention will become more evident from the description of a preferred, but not exclusive, embodiment of a three-phase synchronous rectifier for charging a battery on board the vehicle, illustrated by way of an indicative, yet non-limiting example, in the accompanying tables of drawings wherein:

FIGS. 5 and 6 show, respectively, the graphs in the case of in-phase and out-of-phase connection of the generator windings.

EMBODIMENTS OF THE INVENTION

Figure 1:
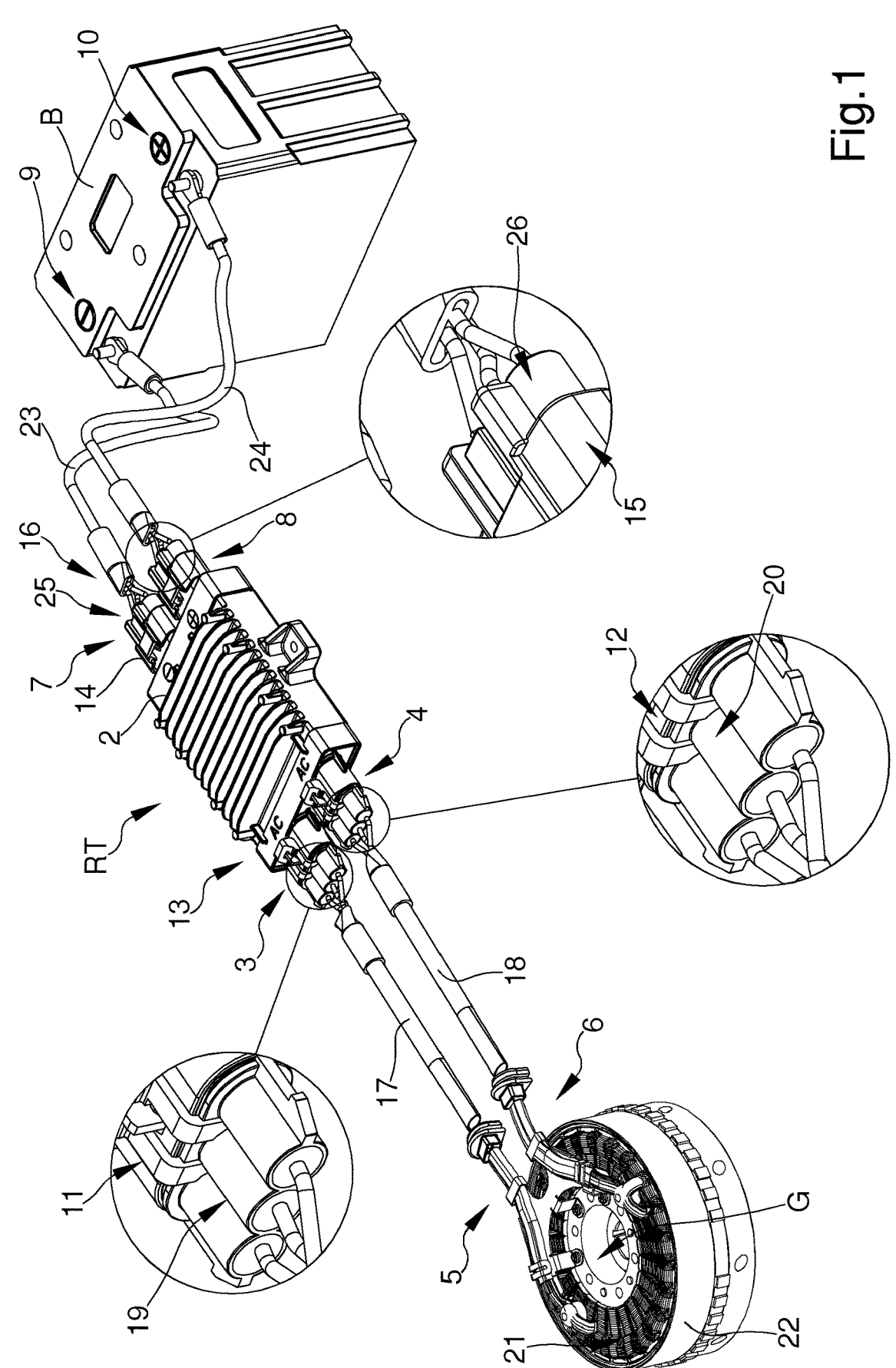
FIG. 1 shows a three-phase synchronous rectifier, usable in conjunction with a generator to charge a vehicle battery according to the invention.

With particular reference to these figures, a three-phase synchronous rectifier has been globally referred to as RT, which can be used in particular in conjunction with a generator G for charging a battery B of a motor vehicle.

In detail, the three-phase synchronous rectifier RT comprises a rectification circuitry 1 installed inside an enclosure 2 wherein a first and a second input 3, 4 independent of each other and each connectable to respective three-phase output branches 5, 6 of the generator G are identified. The rectifier RT is also provided with two negative and positive outputs 7, 8 also independent and each connectable to the respective poles of the battery 9, 10.

Conveniently, the inputs 3, 4 of the rectifier RT are made by means of respective three-pole female input connectors 11, 12 positioned at a same input side 13 of the enclosure 2. Similarly, the outputs 7, 8 are made by means of respective three-pole female output connectors 14, 15 positioned at a same output side 16 opposite the input side 13 of the enclosure 2.

As shown in the example of FIG. 1, the battery B can be connected downstream of the rectifier RT while the generator G can be connected upstream of the rectifier RT. To this end, the connection between the generator G and the rectifier RT can be made by means of two separate and independent upstream wiring harnesses 17, 18, each ending with a respective three-pole male connector 19, 20 intended to be inserted respectively into the three-pole female input connectors 11, 12 of the rectifier RT.

Preferably, the three-pole female input connectors 11, 12 of the rectifier RT are identical to each other and can indifferently receive any of the two three-pole male connectors 19, 20 of the wiring harnesses 17, 18.

According to an embodiment, the generator G is preferably a three-phase permanent magnet alternating current generator of the stator/rotor type in which to the stator 21 are operationally connected the two wiring harnesses 17, 18 to the three-phase output branches 5, 6.

Preferably, the stator 21 of the generator G comprises twenty-four slots with double layer winding coupled to a rotor 22 having sixteen rare earth magnets, arranged in an alternating N-S or Halbach array configuration. Conveniently, each phase of the first output branch 5 and of the second output branch 6 of the generator G is connected with four stator coils of the stator 21 in parallel with each other.

Conveniently, the connection between the rectifier RT and the battery B can be made by means of two separate and independent downstream wiring harnesses 23, 24, each ending with a respective male connector 25, 26 intended to be inserted into the connectors 14, 15 of the rectifier RT.

Preferably, each three-pole female output connector 14, 15 of the rectifier RT is operationally connected to a respective negative and positive output of the rectifier RT. To this end, the output connectors 14, 15 of the rectifier RT are different from each other to avoid any possible misconnections between the battery B and the rectifier RT. Substantially, each male connector 25, 26 of the downstream wiring harnesses 23, 24 may be operationally connected to only one of the negative and positive outputs of the rectifier RT.

Advantageously, as can be seen in the magnifying views of FIG. 1, also the male connectors 19, 20 of the upstream wiring harnesses 17, 18 are of the three-pole type, having to be coupled to the respective three-phase output branches 5 and 6 of the generator G. Since the generator G consists of a stator with two three-phase windings identical to each other and since the rectifier RT has an individual control signal exiting A and common to all the rectification units $U_A$, $U_B$, $U_C$, $U_{A'}$, $U_{B'}$, $U_{C'}$ it follows that the currents of the phases $I_A$, $I_B$, $I_C$, $I_{A'}$, $I_{B'}$, $I_{C'}$ involving the terminals of the two three-phase connectors are equal to each other. As an example, it has been found that this solution allows keeping the currents around 50 $A_{rms}$ per individual terminal of the connectors if the total current to be sent to the battery B is equal to about 150 A. In order to divide the output currents of the rectifier RT, the output connectors 14 for the negative pole and 15 for the positive pole have the three terminals of each connected in parallel internally to the rectifier so that the current $I_{BATT}S$ is $I_{BATT}S/3$ on each of the 3 positive and negative terminals. More precisely in the case of 150 $A_{DC}$ at the output from the rectifier RT, each terminal of the negative and positive connectors 14 and 15 will have a current of 50 $A_{rms}$ flowing through it, while the terminals of the two three-phase connectors will have a current of about 53 $A_{rms}$ flowing through them.

Figure 2:
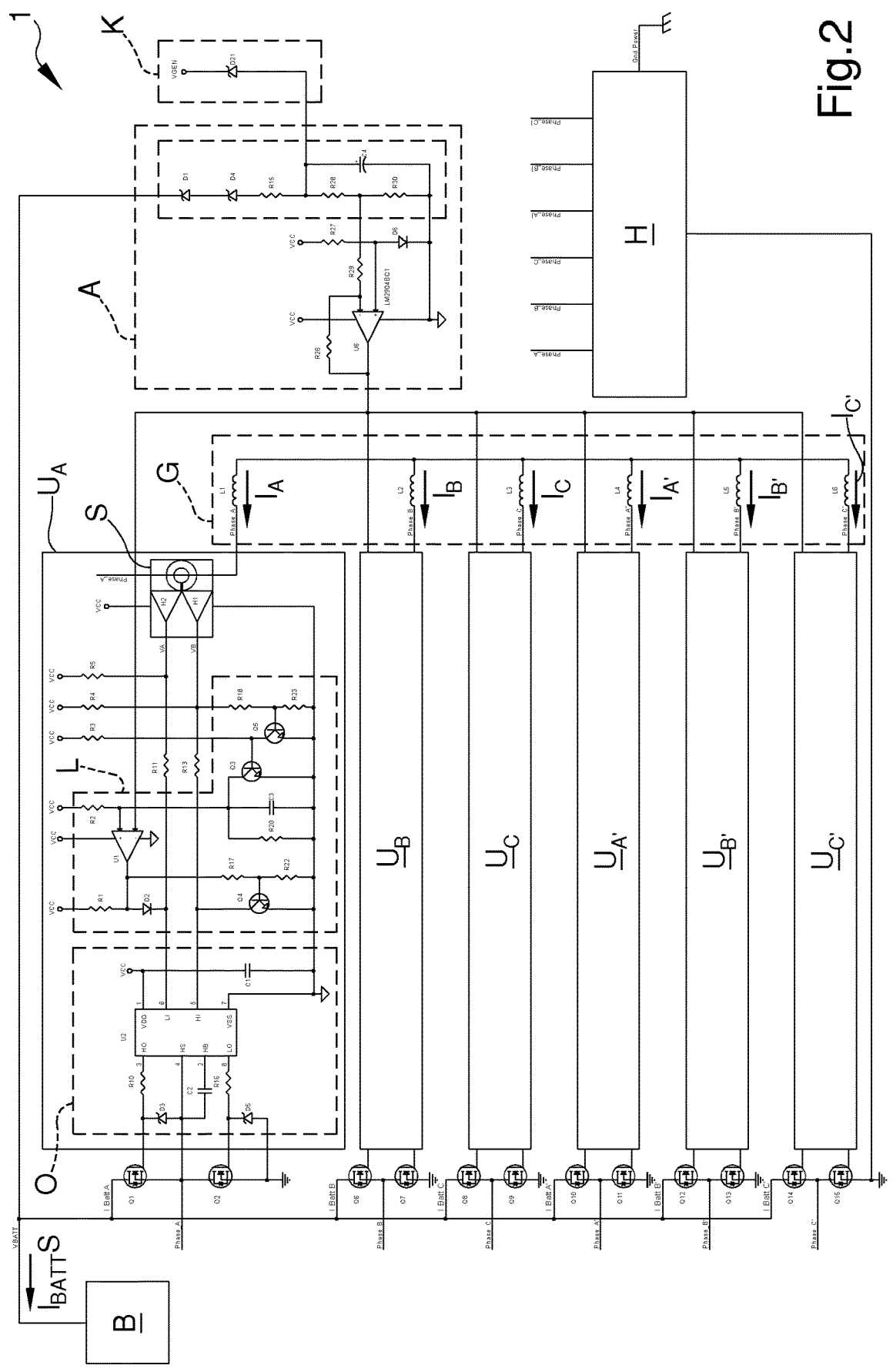
FIGS. 2 and 3 show the circuit diagrams of the rectifier in FIG. 1.

As shown in the example of FIG. 2, the rectifier RT has a first group consisting of three rectification units $U_A$, $U_B$, $U_C$ each in signal communication with the respective phases of the first output branch 5 of the generator G and a second group of three rectification units $U_{A'}$, $U_{B'}$, $U_{C'}$ each in signal communication with the respective phases of the second output branch 6 of the generator G.

Advantageously, the rectification units $U_A$, $U_B$, $U_C$ and $U_{A'}$, $U_{B'}$, $U_{C'}$ are configured to receive at input respective phase currents $I_A$, $I_B$, $I_C$ and $I_{A'}$, $I_{B'}$, $I_{C'}$ from the generator G and to supply at output an individual total rectified current $I_{BATT}S$ to be sent to the battery B of the vehicle. In detail, the total current $I_{BATT}S$ is made up of the sum of the individual rectified currents $I_{BATT}A$, $I_{BATT}B$, $I_{BATT}C$, $I_{BATT}A'$, $I_{BATT}B'$, $I_{BATT}C'$.

It should be noted that the operation of each of the rectification units $U_A$, $U_B$, $U_C$ and $U_{A'}$, $U_{B'}$, $U_{C'}$ the current limiting circuit A intended to limit the current supplied by the generator G to the battery B in the event of the supplied voltage $V_{Batt}$ exceeding a predefined value, as well as the operation of the two embodiments of the sensor S, are entirely similar to what described in the disclosure WO 2019/171320 A1 of the Applicant incorporated herein by way of reference.

Figure 3:
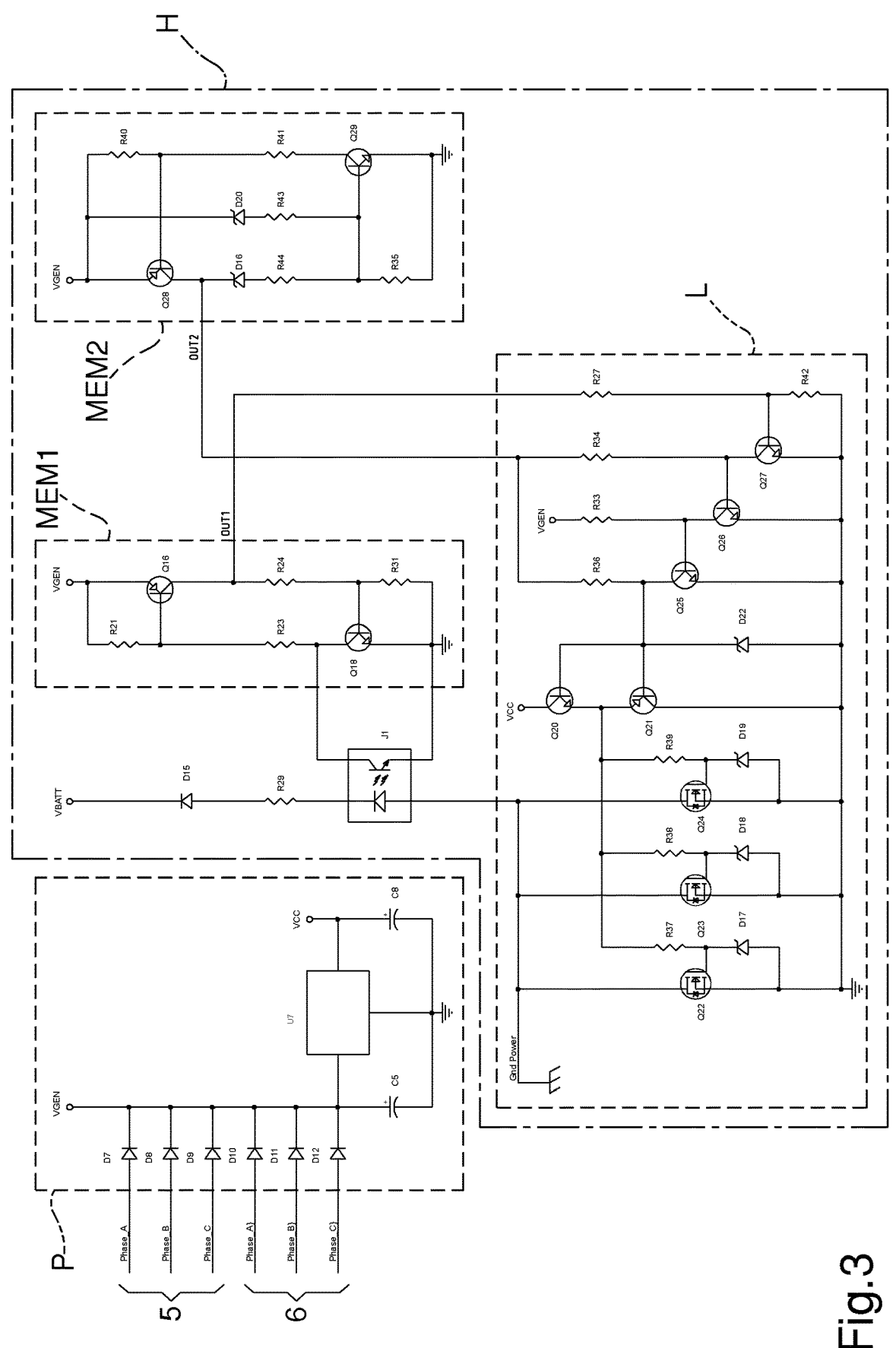

With reference to the example illustrated in FIG. 3, the power supply of the electronic circuitry inside the rectifier RT is carried out by means of a power supply unit P operationally connected to the respective phases of the generator G by simultaneous connection to the two output branches 5, 6. In detail, the power supply unit P comprises a voltage stabilizer U7, known in itself, connected to the six diodes D7÷D12, wherein each anode of each diode is connected to one of the phases of the generator G and the respective cathodes, in common with each other, are connected to an electrolytic capacitor C5. The capacitor C5 is connected in turn to the input of the voltage stabilizer U7, a second terminal connected to the internal negative pole of the regulator while the output, connected to the capacitor C8, provides the stabilized voltage $V_{CC}$ to supply the electronic circuitry inside the rectifier RT.

According to some embodiments of the invention, the rectifier RT may have a plurality of devices to prevent irreparable damage to the control circuitry 1. In the present case, the Applicant has implemented several protection solutions in the event of:

possible disconnections of the battery B, wrong connection of the polarities of the battery B, permanent short circuit at the output of the rectifier RT.

In this context, as illustrated in the example of FIGS. 2 and 3, the rectifier RT may comprise a limitation block K operationally connected to the current limiting circuit A to limit the maximum output voltage of the rectifier RT in case of a disconnection of the battery B in order to safeguard the charges connected to the vehicle electrical system from any damage caused by over-voltages. In particular, the zener diode D21 of the limitation block K is connected with the anode to the capacitor C4 and with the cathode to the capacitor C5, where the voltage $V_{GEN}$ is present. Preferably, the voltage of the zener diode D21 is chosen at a value comprised between 18 and 21 volts.

According to a first operating configuration, that is when the rectifier RT is normally connected to the battery B, the capacitor C5 is charged at a voltage close to the predefined operating voltage of the battery B, equal to about 14.5 Volts, through the six diodes D7÷D12. As the voltage of the zener diode D21 is higher than this predefined value, e.g. 21 Volts, there will be no current flow from C5 to C4 through the zener diode D21 and therefore the regulation voltage on the battery B will not be modified and the rectifier RT will operate normally. According to a second operating configuration, in case of disconnection of the battery B, the total current $I_{BATT}S$ that is circulating from the generator G to the battery B through the Power MOS Q1, Q2, Q6, Q7, Q8, Q9, Q10, Q11, Q12, Q13, Q14 and Q15, as well as the protection ones against battery connection inversion Q22, Q23 and Q24, is suddenly interrupted and consequently passes to charge the capacitor C5 through the six diodes D7÷D12. The voltage $V_{GEN}$ on the capacitor C5 will rapidly increase until it reaches the voltage of the zener diode D21 thus allowing the charging of the filter capacitor C4. At this point the rectifier RT switches from controlling the voltage of the battery B to controlling the voltage on the capacitor C5 which results to be the sum of the voltage of the zener D21 plus the one resulting from the following relation:

$$(R28+R30)/R30 \times 0.6$$

where 0.6 volts represents the drop of the diode D6.

Figure 4:
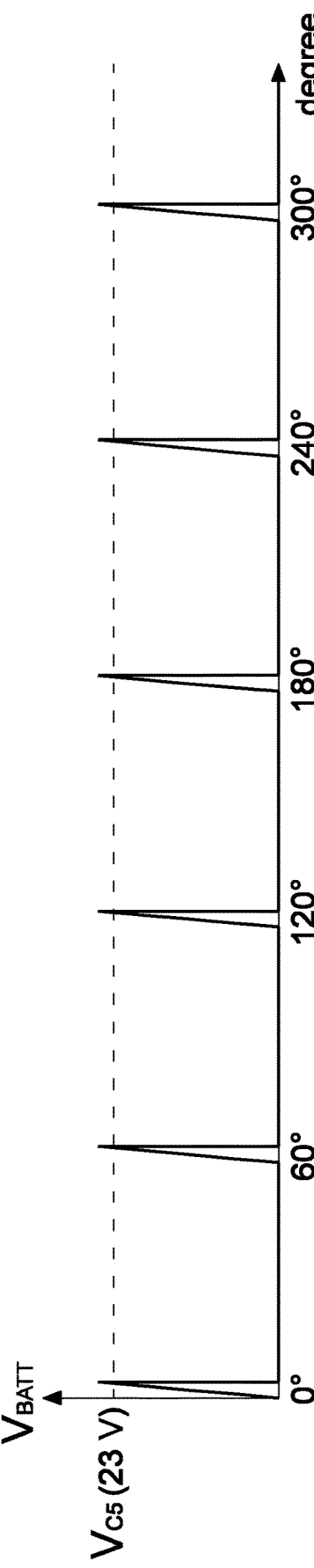
FIG. 4 is a graph illustrating the trend of the output signal on the positive terminal in the case of disconnected battery.

With the battery disconnected, at the output of the rectifier RT on the positive terminal $V_{Batt}$ there will be voltage pulses limited to a voltage of about 23 Volts which also represents the voltage value $V_{C5}$ at which the capacitor C5 is charged through the six diodes D7, D8, D9, D10, D11, D12 as shown in the graph in FIG. 4.

According to one embodiment, the rectifier RT may be configured to verify any wrong polarity connections of the battery B and/or possible short circuits. In this case, as shown in the example of FIGS. 2 and 3, the rectifier RT comprises a verification circuitry H having a control block L connected to a first memory MEM1 and to a second memory MEM2.

The control block L is provided with a plurality of N-channel Power MOS Q22, Q23 and Q24 with the drains and sources in parallel with each other and respectively connected to the negative pole of the battery B (shown in FIG. 3 with the symbol Gnd Power) and to the internal negative pole of the rectifier RT (shown in FIG. 2 with the ground symbol). Preferably, the number of Power MOS to be connected in parallel depends on the maximum current of the rectifier RT being crossed by the entire charging current of the battery B, $I_{BATT}S$.

Three zener diodes D17, D18 and D19 are connected between each gate of the three Power MOS Q22, Q23 and Q24 and their respective sources in order to limit the maximum voltage applied to the gate. The Power MOS Q22, Q23 and Q24 are further connected by means of the three resistors R37, R38 and R39 to the interconnected emitters of the pair of transistors Q20 and Q21, in NPN and PNP configuration respectively, connected with the bases in common. In this way, the transistors Q20 and Q21 are able to deliver high peak currents in order to quickly drive the Power MOS Q22, Q23 and Q24 in conduction or in interdiction.

Conveniently, the control block L also comprises NPN transistors Q25, Q26, and Q27 with the emitters in common and connected to the internal negative terminal of the rectifier RT. As observable, the collector of the transistor Q21 is also connected to the internal negative terminal of the rectifier RT.

The operational connection between the control block L and the memories MEM1 and MEM2 is made as explained below: the collector of Q25 is connected to the bases of Q20 and Q21 and to the output OUT2 of the memory MEM2 by means of R36; the collector of Q26 is connected to the base of Q25 and to the terminal $V_{GEN}$ representing the voltage at which the capacitor C5 is charged, by means of the resistor R33; the collector of Q27 is connected to the base of Q26 and to the output OUT2 of MEM2 through the resistor R34; the base of Q27 is connected to the bias resistor R42 and to the output OUT1 of MEM1 through the resistor R27.

Preferably, the zener diode D22, connected between the collector and the base of Q21 with the anode on the collector, allows limiting the driving voltage applied to the gates of Q22, Q23, Q24 at a lower value than the maximum value allowed by the devices.

With reference to the memory MEM1, on the contrary, the latter is provided with two transistors Q16, Q18, PNP and NPN respectively, connected together in positive reaction through the resistors R21, R23, R24, R31. The collector of Q16 is connected to the resistor R27 of the control block L by means of the output OUT1.

As visible in FIG. 3, the memory MEM1 is operationally connected to an optoisolator J1 in order to control or not the flow of current $I_{BATT}S$ between the control block L and the battery B, while maintaining the electrical insulation between them. In this case, the collector and the emitter of Q18 are connected respectively to the collector and to the emitter of the transistor of the optoisolator J1 which is also connected to the internal negative terminal of the regulator. Additionally, the anode of the diode of the optoisolator J1 is connected to the negative terminal of the battery B and to the positive terminal of the battery B through the resistor R29 and the diode D15 the cathode of which is also connected to the positive terminal of the battery B. Advantageously, this type of configuration allows the flow of current in the diode of the optoisolator J1 only in the case where the battery B is connected to the positive terminal to Gnd Power, i.e. connected with inverted polarity. In this configuration, the transistor of the optoisolator J1 starts conduction and causes the chain conduction of the transistors Q16 and Q18 thus bringing the output OUT1 of the memory MEM1 to the logic level 1 corresponding to the voltage $V_{GEN}$. The logic level 1 of the memory MEM1 thus remains as long as the capacitor C5 remains charged, that is, as long as the generator G is rotating, even if the battery B is disconnected from the rectifier RT. The passage of the memory MEM1 to the logic value 0, i.e. with the output OUT1 at 0 Volt, can only occur when the voltage $V_{GEN}$ is zeroed, i.e. when the generator G is not moving.

Looking again at the memory MEM2 in the FIG. 3, it is necessary to specify that the latter substantially works as a hysteresis comparator where the two transistors Q28 and Q29 are commanded in simultaneous conduction when the voltage $V_{GEN}$ exceeds the value of the voltage of the zener diode D20 added to that determined by the resistive divider R43-R45 on the basis of the transistor Q29. As an example, this voltage can be chosen at a value of about 12 Volts. Since Q28 is in conduction also the output OUT2 of MEM2 will be at the logic level 1, that is until the voltage value $V_{GEN}$ will not fall to a value lower than the voltage determined by the voltage of the zener diode D16 added to that determined by the resistive divider R44-R35 on the basis of the transistor Q29. Again, this voltage can be chosen at a value of about 8 volts. When $V_{GEN}$ drops below this value, the output OUT2 of MEM2 switches to the logic value 0 equal to 0 Volt.

According to an embodiment, in the power supply unit P the electrolytic capacitor C5 may have a predefined capacitance such that it provides power to the entire electronic circuitry inside the rectifier RT through the voltage stabilizer U7 as well as supporting any charging current peaks in the event of disconnection of the battery B from the rectifier RT. Conveniently, the capacitor C5 has a capacitance value ranging from 1000 to 2000 μF, preferably about 1500 μF at a voltage of 25 volts.

Conveniently, when the generator G is set in rotation by the endothermic engine to which it is mechanically connected, the windings generate a current that, through the six diodes D7, D8, D9, D10, D11, D12 charge the capacitor C5 with a voltage $V_{GEN}$. As soon as $V_{GEN}$, through the resistor R33, reaches about 0.6 volts, it polarizes the base of Q25 causing it to saturate, as a result the transistor Q20 will be interrupted and the transistor Q21 will be in conduction thus maintaining the voltage between the gate and source of Power MOS Q22, Q23 and Q24 at zero, therefore interrupted.

In this situation, the rectifier RT is separated from the battery by the Power MOS Q22, Q23 and Q24 until the transistor Q25 is allowed to switch from saturation to interdiction. This condition is only verified if the output OUT2 of MEM2 is at the logic value 1 or $V_{GEN}$ value.

The instant when OUT2 switches to the logic value 1, the transistor Q26 switches to saturation and Q25 interdicts thus allowing Q20 to drive Power MOS Q22, Q23, Q24 in conduction.

In case of wrong connection of battery polarity to the rectifier RT, the current crosses the diode of the optoisolator J1, through R29 and D15 switching the internal transistor of the optoisolator J1 in conduction. Consequently, the transistors Q16 and Q18 will switch to conduction by causing the output OUT1 of MEM1 to the logic value 1 that, through R27 and R42, will allow Q27 and Q25 to switch to conduction by interdicting the three Power MOS Q22, Q23 and Q24.

The condition of logic state 1 of the memory MEM1 will remain until the power supply to the memory itself is cut off, i.e. until the rotor 22 of the generator G is stopped and the battery B is connected with the correct polarity. It follows that this configuration allows the rectifier RT not to be damaged by the incorrect connection of the polarity of battery B as it is disconnected from it.

Since MEM2 is a comparator with hysteresis, the output will switch to the logic value 1 only when $V_{GEN}$ exceeds a typical value of 12 volts and remain in that state until $V_{GEN}$ drops below a typical value of 8 volts.

In actual facts, this condition allows the generator to begin charging the battery only when the voltage of the generator $V_{GEN}$, on the capacitor C5, has exceeded 12 Volts and is maintained until it drops below 8 Volts; during operation, if there is a short circuit between the positive terminal and the negative terminal, the regulator remains connected to the output until the voltage $V_{GEN}$ drops below 8 Volts which causes the Power MOS Q22, Q23, and Q24 to open.

The voltage $V_{GEN}$ begins to rise again to 12 volts, switching the Power MOS Q22, Q23, and Q24 back to conduction, thus allowing the rectifier RT to remain regularly powered without showing overheating problems due to the lack of power. Improper driving of the Power MOS would result in a destructive temperature rise for the devices themselves.

Finally, it should be specified that the operating mode described above allows, during the starting phase when the battery voltage may drop to 6 Volts, not to overload the starter motor of the endothermic engine, since the generator G does not supply current to the battery B even when the latter has a lower voltage than 6 Volts.

According to a further embodiment, the three-phase windings of the generator G can be connected to the rectifier RT in phase opposition. This type of connection makes it possible to reduce the voltage ripple on the battery B due to the pulsating current in case of intermediate charges. As illustrated in the examples of FIGS. 5 and 6, the situation of a charge is represented that absorbs a battery current equal to a quarter of the maximum current that can be delivered by the generator G. With the same average current $I_{BATT}$S delivered to the battery B in the two cases, the rms value of the current $I_{BATT}$S is lower in FIG. 6. This configuration implies less dissipation along the downstream wiring harnesses 23, 24 between the rectifier RT and the battery B and also less voltage ripple on the battery B itself.

It has in practice been ascertained that the described invention achieves the intended objects.

In particular, the use of an individual rectifier allows keeping the currents in the two output branches of the generator balanced within a compact solution that allows, at the same time, stable adjustments even in cases of battery disconnection or short circuits without affecting the other charges of the vehicle. Obviously, the embodiments and versions described and illustrated hereinabove are to be considered purely for illustrative purposes, and a skilled person in the art may, in order to meet contingent and specific needs, make numerous modifications and variations to the rectifier according to the above-described invention, including for example the combination of said embodiments and versions, all of which are however contained within the scope of protection of the invention as defined by the following claims.

The invention claimed is:

1. A three-phase synchronous rectifier for charging a battery on board a vehicle, the three-phase synchronous rectifier comprising:

a first and a second input which are independent of each other and each connectable to a respective first and second three-phase output branch of a generator;

two independent negative and positive outputs each connectable to the respective poles of said battery;

a first group of three rectification units configured to be connected to said first output branch of said generator by means of said first input; and a second group of three rectification units configured to be connected to said second output branch of said generator by means of said second input, a limitation block operationally connected to a current limiting circuit to limit a maximum output voltage in case of battery disconnection, wherein the connection between said limitation block and said current limiting circuit is made by means of a zener diode operating at a voltage ranging from 18 to 21 Volts:

wherein said rectification units are configured to be simultaneously connected to the battery of said vehicle.

2. The three-phase synchronous rectifier according to claim 1, wherein said rectification units are configured to receive at input respective phase currents from said generator and to supply at output an individual total rectified current to be sent to said battery of the vehicle.

3. The three-phase synchronous rectifier according to claim 2, wherein said total current is made up of the sum of the individual currents rectified by said rectification units.

4. The three-phase synchronous rectifier according to claim 1, further comprising: a power supply unit operationally connected to the respective phases of said generator by simultaneous connection to the two output branches to deliver a stabilized voltage for the power supply of the internal electronic circuitry of the rectifier.

5. The three-phase synchronous rectifier according to claim 4, wherein said power supply unit comprises a voltage stabilizer configured to be connected at input to an electrolytic capacitor charged by the phases through the diodes and at output to a second capacitor to deliver said stabilized voltage.

6. A three-phase synchronous rectifier for charging a battery on board a vehicle, the three-phase synchronous rectifier comprising:

a first and a second input which are independent of each other and each connectable to a respective first and second three-phase output branch of a generator;

two independent negative and positive outputs each connectable to the respective poles of said battery;

a first group of three rectification units configured to be connected to said first output branch of said generator by means of said first input;

a second group of three rectification units configured to be connected to said second output branch of said generator by means of said second input, wherein said rectification units are configured to be simultaneously connected to the battery of said vehicle;

a control block operationally connected to a first memory and to a second memory; and an optoisolator operationally connected to said first memory in order to allow or not the passage of current between said control block and said battery.

* * * * *